Feb. 15, 1949.　　　　K. CLARK　　　　2,461,629
CLUTCH AND BRAKE MECHANISM
Original Filed May 31, 1942　　　　4 Sheets-Sheet 1

INVENTOR.
Kendall Clark
BY Spencer Hardman and Fehr
Attorneys

Feb. 15, 1949.　　　　K. CLARK　　　　2,461,629
CLUTCH AND BRAKE MECHANISM
Original Filed May 31, 1942　　　　4 Sheets-Sheet 3

INVENTOR.
Kendall Clark
BY
Spencer Hardman and Fehr
Attorneys

Patented Feb. 15, 1949

2,461,629

UNITED STATES PATENT OFFICE 2,461,629

CLUTCH AND BRAKE MECHANISM

Kendall Clark, Oakwood, Ohio, assignor to General Motors Corporation, Dayton, Ohio, a corporation of Delaware Original application May 31, 1942, Serial No. 437,075, now Patent No. 2,346,152, dated April 11, 1944. Divided and this application March 2, 1944, Serial No. 524,695

9 Claims. (Cl. 192—12)

This application is a division of my application Serial No. 437,075 filed May 31, 1942, Patent 2,346,152, issued April 11, 1944, and a continuation in part of my application Serial No. 358,871, filed September 28, 1940, Patent 2,366,236, issued Jan. 2, 1945, and is particularly directed to an inertia operated means for controlling the operation of washing and centrifugal machines and to resilient supporting means therefor.

An object of the invention is to provide an inertia operated means with means for insuring its proper operation under a variety of conditions for controlling washing machines and other devices.

Another object of my invention is to provide a washing machine of the centrifugal type with an improved resilient support.

Further objects and advantages of the present invention will be apparent from the following description, reference being had to the accompanying drawings, wherein a preferred form of the present invention is clearly shown.

Figure 1:
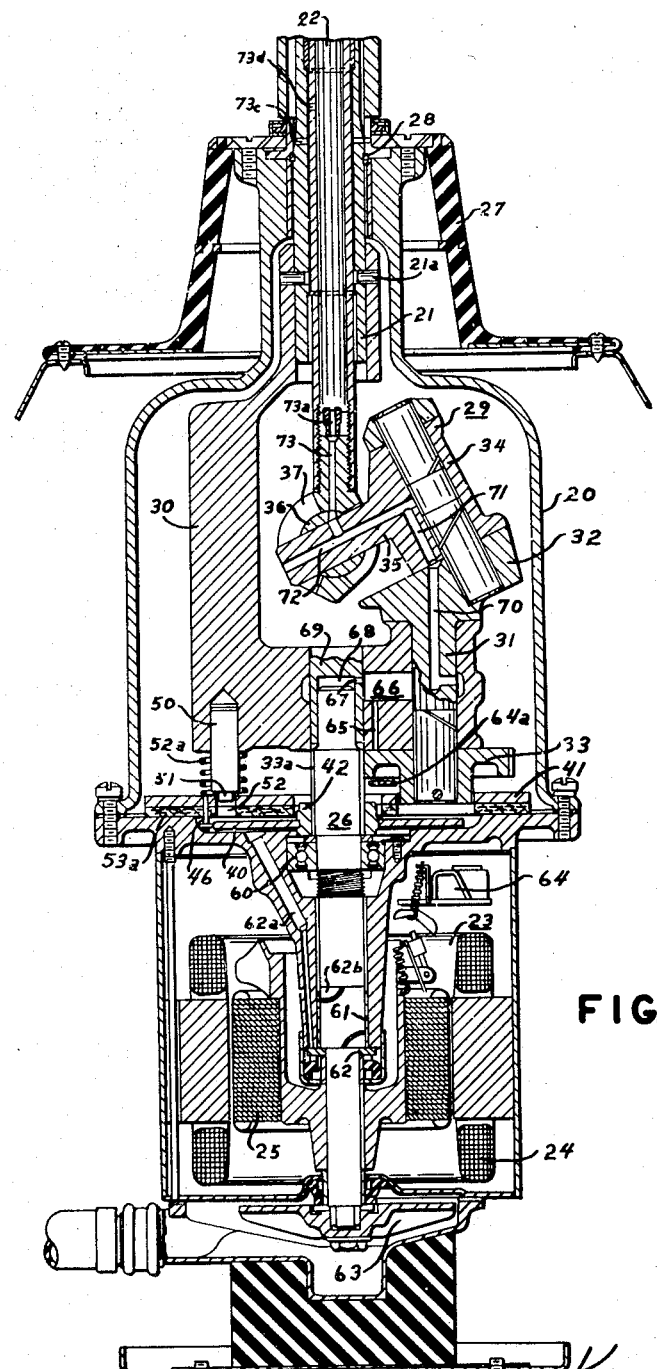
Fig. 1 is a vertical cross-section of a driving mechanism embodying features of my invention.
Figure 2:
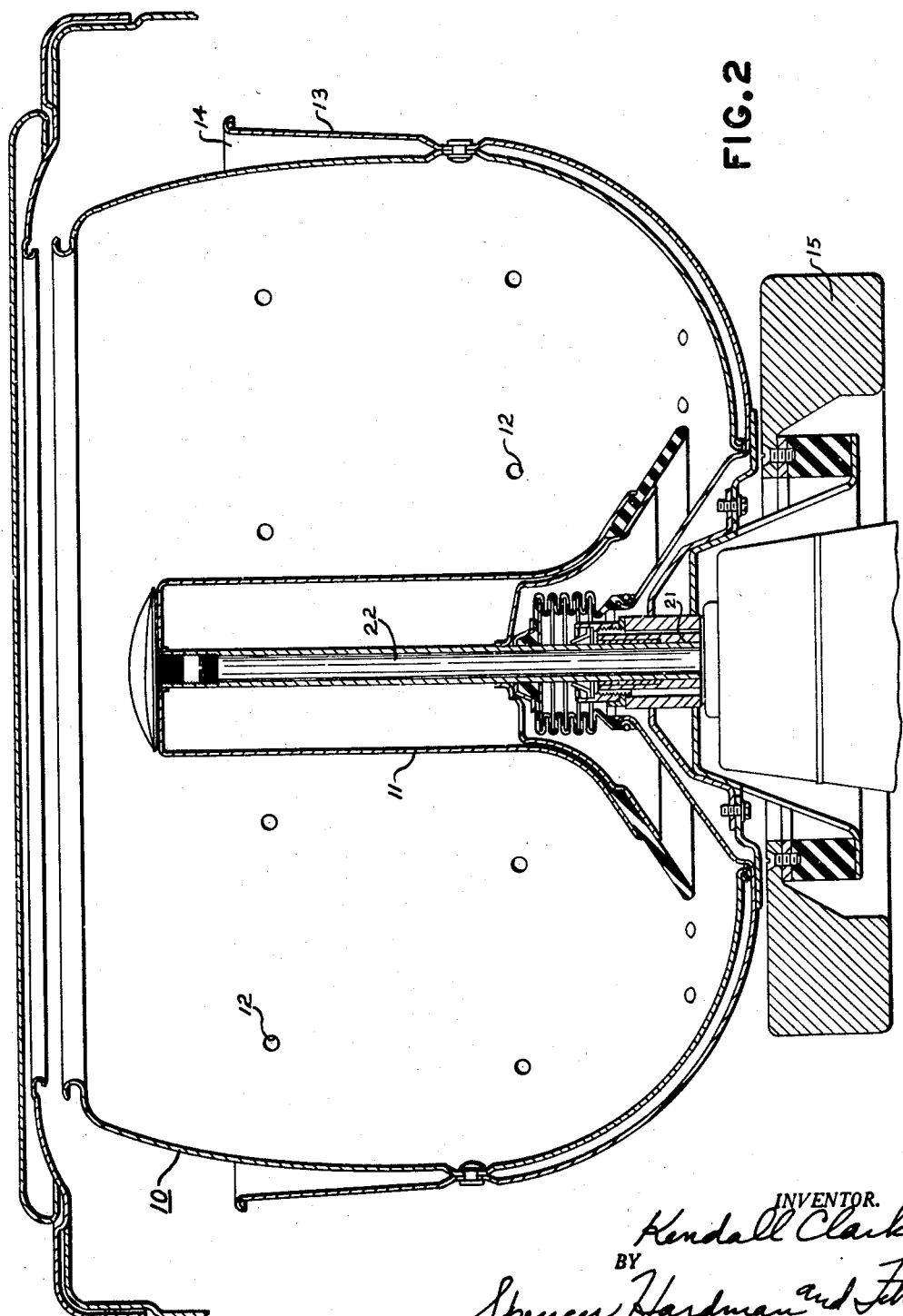
Fig. 2 is a vertical cross-section of the tub, or rotatable driven member and the agitator, or reciprocable member.

A driving mechanism embodying my invention is adaptable to a large number of uses; and is particularly adaptable to a washing machine, wherein a rotatable tub 10 contains a vertically reciprocable member or agitator 11, and in which washing machine clothes and washing liquid may be placed in the tub 10. When the tub 10 remains stationary, the agitator 11 is vertically reciprocated to wash the clothes. Thereafter, the vertical reciprocation of the agitator is stopped, and the tub is rotated so that the liquid in the tub passes through the perforations 12 into the outer tub 13 and is discharged over the rim 14. This operation wrings the clothes after the same have been washed. Details of the operation of the tub and agitator, together with the counterbalancing means 15 connected by a resilient rubber ring to the tub 10 are more fully described and claimed in my copending application S. N. 358,871, filed Sept. 28, 1940.

The mechanism shown in Fig. 1 is used for imparting rotary motion to the tub, or rotary driven member, 10, and to and fro motion or reciprocation to the agitator, or reciprocable member, 11. This mechanism may include a transmission housing 20, a rotatable driven sleeve or shaft 21, and a reciprocable driven shaft 22. Preferably these shafts are co-axially arranged, and are connected respectively to the tub 10 and agitator 11. A power means 23 is connected to the housing 20, and a transmission is placed in the housing 20 which is capable of imparting rotation to the sleeve or shaft 21 and reciprocation to the shaft 22. Preferably the power means 23 is a reversible electric motor having stator windings 24 and a rotor 25, the rotor being drivingly connected to the rotary driving shaft 26. By suitable well-known electrical controls, the stator 24 may be electrically energized selectively to rotate the rotor 25 and shaft 26 in opposite directions.

The housing 20 preferably is mounted on a resilient rubber sleeve 27 supported upon a metal base. It is provided at one end with a journal 28 on which the rotary sleeve or shaft 21 is journaled. The shaft 22 is journaled within the sleeve 21 and extends to the rotary-reciprocating transmission 29 mounted on a rotatable member or cage 30 within the housing 20. The rotatable member or cage 30 is drivingly connected to the rotatable sleeve 21 through the medium of pins 21a.

Figure 3:
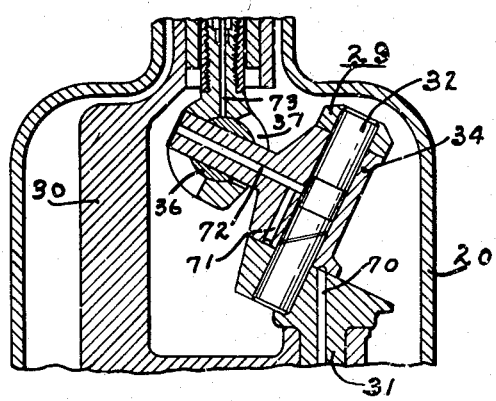
Fig. 3 is a cross-section of a portion of the mechanism shown in Fig. 1, with the reciprocable shaft in its upper position.

The rotary-reciprocating transmission 29 preferably comprises a rotary driven shaft 31 having an angularly disposed pin or bearing 32 at one end, and a gear 33 at the other end. The pin or bearing 32 carries a sleeve 34 having an extension 35, which extends into the ball or cylinder 36 journaled in the head 37 of the shaft 22. The arrangement is such that, when the cage 30 is maintained stationary, the gear 33 and pin 31 may be rotated by the shaft 26, and this in turn imparts vertical reciprocating motion to the shaft 22 through the medium of the members 32 to 37 inclusive. The reciprocating motion is evident by comparison between Figs. 1 and 3 wherein the lower and upper positions of shaft 22 are indicated, respectively.

A driving connection is provided between the rotary drive shaft 26 and the cage 30 such that the cage 30 may be rotated in unison with the shaft 26 or the cage 30 may be maintained stationary, so that the shaft 26, which is geared at 33a to the gear 33 may rotate the latter with respect to the cage 30. This is accomplished, in this embodiment, by providing a shiftable clutch 40, which cooperates with the combined brake plate and driven clutch member 41 to rotate or to stop the cage 30. To accomplish this, the shiftable clutch 40 is mounted on a spiral track 42 on the shaft 26, and is provided with a one-way frictional clutch or wire 43 placed in the groove 44. This wire 43 has strong frictional engagement with the disc 40 in one direction and very little friction in the other direction. The wire 43 is provided with a loop 45 at one end which is wrapped around a pin 46 carried by the combined brake and driven clutch disc 41. The other end of wire 43 is located at 47. When the disc 40 rotates clockwise (Fig. 4) the wire 43 wraps tightly around disc 40 and has strong frictional engagement. In the opposite direction there is practically no friction.

The combined driven clutch member and brake 41 is longitudinally supported on the cage 30 by means of a plurality of pins 50 fixed along the bottom of cage 30. These pins carry combined guides and abutments 51 at their lower ends to engage openings 52 in the plate 41. Compression springs 52a surround the pins 50. The construction is such that the plate 41, together with its brake facing 53 is urged downwardly by the springs 52 against the fixed or stationary brake surface 53a unless the plate 41 is urged upwardly by the clutch disc 40. When the brake 41 engages the stationary surface 53a, the cage 30 is brought to a stop and remains stationary until the brake 41 is again raised.

When the shaft 26 rotates in one direction, the spiral track 42 raises the disc 40 into engagement with the brake lining 53 and raises the disc 41 against the abutments 51 and free of the stationary brake surface 53a. This provides a driving engagement from the shaft 26, through the plates 40 and 41 and pins 50 to the cage 30 and rotates the cage and hence the tub 10. When the shaft 26 is stopped, or is reversed, the relative rotation between the cage 30 and shaft 26 causes a relative rotation between the disc 40 and spiral track 42 which lowers the discs 40 and 41, so that the brake surface 53 comes in contact with the stationary brake surface 53a. This stops rotation of the cage 30. If the shaft 26 is rotating in the proper direction, (counterclockwise) there is a gear drive between the shaft 26 and the gear wheel 33 which causes the shaft 31 to rotate about its own axis and thereby reciprocate the shaft 22.

The wire 43 is wrapped around the disc 40 in such a direction that when the disc 40 is urged in a clockwise direction (Fig. 4), there is a drag on the disc due to the wire wrapping on wire 43. This provides a relative movement between the disc 40 and the spiral track 42 which causes the disc 40 to elevate and raise the disc 41. When the movement of shaft 26 is in the other direction, however, the tendency is to unwrap the wire 43 and thus permit the disc 40 freely to fall, thus allowing the brake disc 41 to be lowered into braking action under the impulse of springs 52a, after which the disc 40 is allowed to rotate freely relatively to the wire 43 and the disc 41 without perceptible frictional engagement between these parts.

Other details which may aid in the operation of the device may include a journal at 60 for the shaft 26. This shaft extends downwardly and may have a cantilever overhang beyond the lower bearing 61, the rotor 25 being secured on this cantilever overhang. An oil seal 62 may be provided at this point to retain the oil within the housing 20 and prevent its downward flow beyond this point. Oil may circulate to the oil seal 62 by passages 62a and 62b. If desired, a pump 63 may be placed at the lower end of shaft 26 for the purpose of pumping washing liquid from a sump, not shown, surrounding the tub 10 to a suitable place of disposal, as more fully described in my copending application. The motor may be provided with the usual starting winding centrifugal cut-out 64. The driving mechanism is also supported by a rubber block resting upon a metal base beneath the pump 63. Other details of assembly and construction are evident from the drawing and are not described in detail, since they are old per se, and their mode of operation are well-known.

Figure 5:
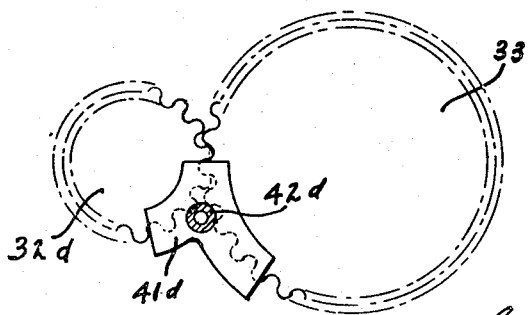
Fig. 5 is a view, somewhat diagrammatic showing the lubricant pump features.

The gear wheel 33, and the gears 33a at the upper end of shaft 26 cooperate with a plate 64a shown in Fig. 5 and placed below the gear wheel 33 adjacent the gear 33a, to form an oil gear pump, which forces lubricant through the passageway 65 into the pocket 66 and from thence through the passage 67 to the chamber 68 at the upper end of the journal 69 in which the shaft 26 rides. Lubricant may also flow through the passages 70 and 71 to the surfaces between the pin 32 and sleeve 34. A further lubricant passage 72 provides for lubrication of the bearings around and about the lower end of the shaft 22, and a passage 73, having a restricted opening 73a, provides for upward passage of lubricant to the interior of shaft 22 and out through openings 73b and 73c to the upper bearings of the shafts 21 and 22.

Figure 4:
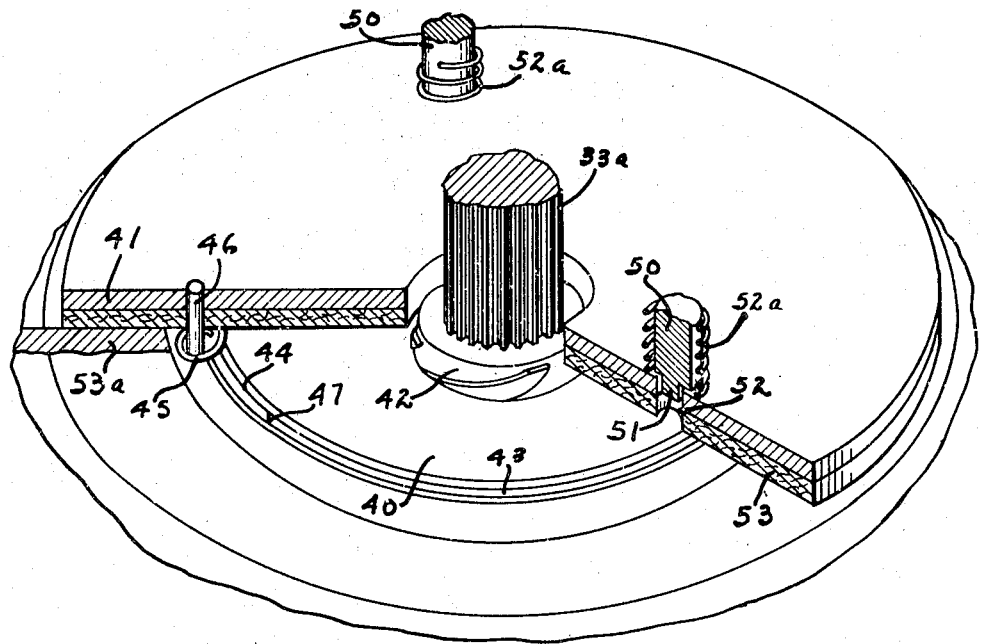
Fig. 4 is an enlarged view in perspective of the driving clutch and brake shown in Fig. 1.

In the operation of the device, clothes and washing fluid are placed in the tub 10. The windings 24 are then energized to rotate the shaft 26 counterclockwise (Fig. 4). This causes shaft 26 to rotate relatively to cage 30 because the brake disc 41 remains in its lower position. The shaft 26 rotates the shaft 31 causing pin 32 to reciprocate the shaft 22 and agitator 11 to wash the clothes.

After a proper interval of time, the motor windings are energized to rotate shaft 26 clockwise (Fig. 4). This causes track 42 to elevate discs 40 and 41 and produce a driving engagement between shaft 26 and cage 30 to rotate the cage 30. This in turn rotates sleeve 21 and tub 10 to wring the clothes centrifugally.

After sufficient tub rotation, the motor windings 24 are deenergized. This causes the motor rotor and shaft 26 to drag enough to allow the discs 40 and 41 to be lowered so that disc 41 and its brake lining 53 engages stationary brake surface 53a. This applies a brake to cage 30 and to tub 10 to bring them to a stop.

These operation may then be repeated with one or more rinse waters.

Figure 6:
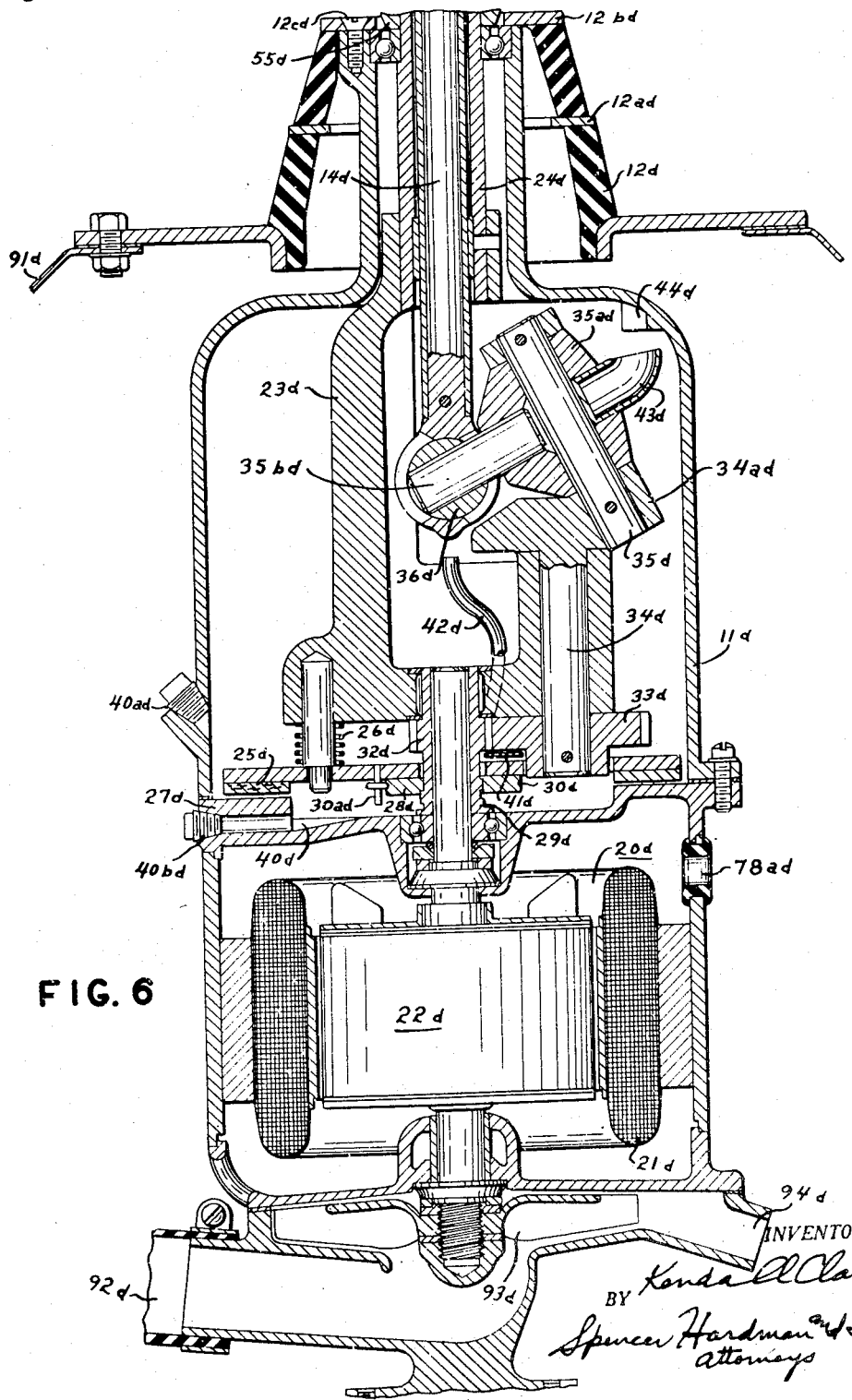
Fig. 6 is a view similar to Fig. 1 of a modified form of the invention.

Fig. 6 shows a modification substantially as disclosed in my said copending application Serial No. 358,871, of which the present application is a continuation in part. In Fig. 6 the housing 11b is supported on a rubber collar 12d which has a metal ring 12ad at an intermediate point and an upper metal ring 12bd, which rings are vulcanized to the rubber. The housing 11d is supported from the metal ring 12d by means of screws 12cd.

A vertically reciprocable shaft 14d is placed coaxially within the rotatable sleeve 24d, which is keyed to the rotatable cage 23d. The motor rotor and shaft 22d of the motor 20d are rotated selectively in either direction by the proper energization of the stator windings 21d.

The brake plate 25d is keyed on the cage 23d by the pins surrounded by the springs 26d, and is moved to and away from the stationary brake surface 27d against the compression of springs 26d, by means of the disc 28d, in cooperation with the spiral track 29d and the wire 30d, which surrounds the disc 28d and is secured to the pin 30ad carried by the disc 25d. This construction is substantially the same in function and operation as the corresponding construction in Figs. 1 to 5.

The rotary-reciprocating transmission is mounted on the cage 23d and includes a small gear wheel 32d secured to the motor shaft, which meshes with the larger gear wheel 33d, secured to the rotary shaft 34d having an upper head 34ad. The head 34ad is provided with an angularly disposed pin 35d on which a sleeve 35ad has a bearing and carries an extension 35bd, which slidably engages the ball or cylinder 36d, having a bearing in the lower portion of the shaft 14d.

When the motor rotor 22d is rotated in one direction, the disc 28d is elevated to lift the brake disc 25d away from the stationary brake surface 27d. The disc 25d is then rotated by the reaction from the motor shaft through disc 28d. This causes the cage 23d to rotate and thus rotate the tub to which it is connected. When the motor rotor 22d is coasting at a slower rate than the rotating tub, as when the stator 21d is deenergized after the clothes drying operation is completed, the discs 25d and 28d are lowered, by the track 29d, until there is contact between the disc 23d and the stationary brake surface 27d. This brings the cage 23d to a stop. Thereafter, when the motor rotor 22d is rotated in the opposite direction, agitation is produced, because the cage 23d is maintained in a sationary condition by the action of the brake disc 25d on the surface 27d, and the gear wheel 32d drives the gear wheel 33d to produce vertical reciprocation of the shaft 14d, thus vertically reciprocating the agitator to which the shaft 14d is connected Other features shown in Fig. 6 may include the supporting framework 55d of the rotatable basket, the support 91d of the collar 12d, plugs 40ab and 40bd for introducing and draining lubricant, water pump 93d, which may receive liquid from the casing surrounding the tub, not shown, through the hose 92d, and may discharge the liquid through the outlet 94d. The lubricant may flow through the channel 40d, when it is being drained by the removal of the plug 40bd. The motor leads may be introduced through the opening at 78ab. Lubrication in this case may be partly by the splashing system produced by the action of the gears 32d, 33d and the plate 41d, which forces lubricant through the pipe 42d against the upper portions of the rotary-reciprocating transmission. Some of the lubricant may be splashed against the lug 44d and may drip into the cup 43d to lubricate the bearings between the pin 35d and sleeve 35ab.

Further details of the mechanism shown in Fig. 6 are disclosed in my said copending application, to which reference is made, if necessary, for a further disclosure thereof.

In the operation of the device, clothes and washing liquid are introduced into the tub and the motor is rotated in the proper direction to reciprocate the agitator. Thereafter the direction of rotation of the motor is reversed, thus rotating the tub and centrifugally extracting the liquid from the clothes. Thereafter the motor is deenergized to apply a braking action and to stop rotation of the tub. The operations may be repeated one or more times with rinse water.

While the forms of embodiment of the invention as herein disclosed, constitute a preferred form, it is to be understood that other forms might be adopted, all coming within the scope of the claims which follow.

What is claimed is as follows:

1. In combination, a rotatable member, a reversible driving means, means including an axially movable inertia device axially operable by the rotation of said driving means in one direction for connecting said driving means and said rotatable member and operable by the reverse rotation of the driving means to disconnect the driving means from said rotatable member, and a friction clutching means for clutching said inertia device to said rotatable member.

2. In combination, a rotatable member, a reversible driving means, means including an inertia device operable by the rotation of said driving means in one direction for connecting said driving means and said rotatable member and operable by the reverse rotation of the driving means to disconnect the driving means from said rotatable member, and a one-way clutching means for clutching said inertia device to said rotatable member.

3. In a combination, a rotatable member, a reversible driving means including a shaft means, an inertia member provided with a generally helical camming connection with the shaft means, means operated by the axial movement of said inertia member in one direction for connecting the driving means and the rotatable member and by the movement in the opposite direction for disconnecting the driving means and the rotatable member, and a one-way clutching means for clutching said inertia device to the rotatable member when said device rotates relative to said rotatable member in the direction to move axially toward the rotatable member.

4. In combination, a rotatable member, a reversible driving means, a relatively stationary means, means including an inertia device operable by the rotation of the driving means in one direction for connecting said driving means and said rotatable member and operable by the reverse rotation of the driving means to disconnect the driving means from the rotatable member and connecting the rotatable member and said stationary means, and a friction clutching means for clutching said inertia device and said rotatable member.

5. In combination, a rotatable member, a reversible driving means, a relatively stationary means, means including an inertia device operable by the rotation of the driving means in one direction for connecting said driving means and said rotatable member and operable by the reverse rotation of the driving means to disconnect the driving means from the rotatable member and connecting the rotatable member and said stationary means, and a one-way clutching means for clutching said inertia device and said rotatable member.

6. In combination, a first rotatable means, a reversible driving means, a second rotatable means operable by the rotation of the driving means in one direction for connecting the driving means and the first rotatable means and operable by the reverse rotation of the driving means to disconnect the driving means from the first rotatable means, and a wound spring member having one portion connected to one of the rotatable means and another portion wound around and frictionally engaging a portion of the other rotatable means for frictionally clutching the two rotatable means together.

7. In combination, a first rotatable means, a reversible driving means, a relatively stationary means, a second rotatable means operable by the movement of the driving means in one direction for connecting said driving means and first rotatable means and operable by reverse movement of the driving means to disconnect the driving means from the first rotatable means and connecting the first rotatable means and stationary means, and a wound spring member having one portion connected to one of the rotatable means and another portion wound around and frictionally engaging a portion of the other rotatable means for frictionally clutching the two rotatable means together.

8. In a combination, a reversible rotatable driving means, a second rotatable means rotatably mounted upon the rotatable portion of said driving means, said driving means and second means being provided with interacting axial cam means providing relative axial movement with relative rotation, a third rotatable means located on one side of said second means within the limit of its axial travel, and a wound spring member having one portion connected to the third rotatable means and another portion wound around and frictionally engaging a portion of the second rotatable means for frictionally clutching the second and third rotatable means together.

9. In combination, a reversible rotatable driving means, a second rotatable means rotatably mounted upon the rotatable portion of said driving means, said driving means and second means being provided with interacting axial cam means providing relative axial movement with relative rotation, a third rotatable means located on one side of said second means within the limit of its axial travel, a stationary means located upon the other side of said second means within the limit of its travel, and a wound spring member having one portion connected to the third rotatable means and another portion wound around and frictionally engaging a portion of the second rotatable means for frictionally clutching the second and third rotatable means together.

KENDALL CLARK.

REFERENCES CITED

The following references are of record in the file of this patent:

UNITED STATES PATENTS

| Number | Name | Date |
| --- | --- | --- |
| 454,261 | Dyblie | June 16, 1891 |
| 1,437,514 | Graydon | Dec. 5, 1922 |
| 1,713,713 | Philips | May 21, 1929 |
| 1,902,701 | Hegemann | May 21, 1933 |
| 2,222,329 | Watts | Nov. 19, 1940 |
| 2,269,190 | Dunham | Jan. 6, 1942 |
| 2,313,928 | Dyer | May 16, 1943 |
| 2,331,897 | Dyer | Oct. 19, 1943 |
| 2,346,152 | Clark | Apr. 11, 1944 |
| 2,346,158 | Dyer | Apr. 11, 1944 |

FOREIGN PATENTS

| Number | Country | Date |
| --- | --- | --- |
| 618,767 | Germany | Sept. 14, 1935 |